US007004640B2

(12) United States Patent
Bush et al.

(10) Patent No.: US 7,004,640 B2
(45) Date of Patent: Feb. 28, 2006

(54) LOW PROFILE LOCAL INJECTION AND DETECTION SYSTEM FOR OPTICAL FIBER WAVEGUIDES

(75) Inventors: Simon P. Bush, Ambler, PA (US); John A. Crowell, Wilmington, DE (US); John A. Snedeker, Chatham, PA (US)

(73) Assignee: Aurora Instruments, Inc., Ambler, PA (US)

( * ) Notice: Subject to any disclaimer, the term of this patent is extended or adjusted under 35 U.S.C. 154(b) by 121 days.

(21) Appl. No.: 10/806,538

(22) Filed: Mar. 23, 2004

(65) Prior Publication Data

US 2004/0190834 A1 Sep. 30, 2004

Related U.S. Application Data

(60) Provisional application No. 60/456,875, filed on Mar. 24, 2003.

(51) Int. Cl.
G02B 6/38 (2006.01)
(52) U.S. Cl. ............................. 385/55; 385/52; 385/39; 385/50; 385/87
(58) Field of Classification Search ...................... None
See application file for complete search history.

(56) References Cited

U.S. PATENT DOCUMENTS

| | | | |
|---|---|---|---|
| 4,274,707 A | 6/1981 | Pacey et al. | 350/96.2 |
| 4,548,630 A | 10/1985 | Biedka | 65/2 |
| 4,696,535 A | 9/1987 | Saha | 350/96.15 |
| 4,735,481 A | 4/1988 | Lukas et al. | 350/96.2 |
| 4,765,704 A | 8/1988 | Pers | 350/96.15 |
| 4,790,617 A | 12/1988 | Campbell et al. | 350/96.15 |
| 4,824,199 A | 4/1989 | Uken | 350/96.15 |
| 4,832,438 A | 5/1989 | Engel et al. | 350/96.2 |
| 4,911,524 A | 3/1990 | Itoh et al. | 350/96.21 |
| 4,950,046 A | 8/1990 | Hughes et al. | 350/96.18 |
| 4,978,201 A | 12/1990 | Yamada et al. | 350/320 |
| 5,002,357 A | 3/1991 | Newell | 350/96.2 |
| 5,011,259 A | 4/1991 | Lieber et al. | 350/96.21 |

(Continued)

OTHER PUBLICATIONS

Ericsson, "PM Splicing with Ericsson—Fusion Splicer FSU 995 for Industrial Splicing", http://www.ericsson.com/networktechnologies/printed/broshyr/1061_pm_revc.pdf.

(Continued)

*Primary Examiner*—Kaveh Kianni
(74) *Attorney, Agent, or Firm*—Ernest D. Buff & Associates, LLC; Ernest D. Buff; Gordon E. Fish

(57) ABSTRACT

A local injection and detection system assesses the attenuation of light propagating from a first optical fiber to a second optical fiber associated therewith. The system comprises a light injector, a light detector, a driver to energize a light source in the injector, and a receiver. Light from the light source is injected into the first optical fiber and propagates therethrough. A portion of the propagating light in the second fiber is extracted onto a light responsive element in the detector. The system is particularly adapted for use in a system for splicing optical fibers, the system minimizing the insertion loss of the joint by optimally aligning the fibers prior to fusing them. In addition, the insertion loss of a joint can be inferred by comparing light attenuation before and after the joint is fused.

The present system is compact and low in profile, enabling it to be used with a fusion splicer that operates with minimal clearance to adjacent equipment and structures. Simplicity of design and operation enable accurate alignment and low loss fusion of fibers for which only a minimal amount of free slack is available.

8 Claims, 5 Drawing Sheets

U.S. PATENT DOCUMENTS

| | | | | |
|---|---|---|---|---|
| 5,195,157 | A | 3/1993 | Penfold | 385/96 |
| 5,249,246 | A | 9/1993 | Szanto | 385/96 |
| 5,249,247 | A | 9/1993 | Whitesmith | 385/96 |
| 5,257,337 | A | 10/1993 | Grigsby et al. | 385/99 |
| 5,340,371 | A | 8/1994 | Dyott | 65/501 |
| 5,417,733 | A | 5/1995 | Wesson | 65/378 |
| 5,481,640 | A | 1/1996 | Harman et al. | 385/147 |
| 5,533,160 | A | 7/1996 | Watanabe et al. | 385/96 |
| 5,561,728 | A | 10/1996 | Kobayashi et al. | 385/97 |
| 5,570,446 | A | 10/1996 | Zheng et al. | 385/98 |
| 5,677,973 | A | 10/1997 | Yuhara et al. | 385/90 |
| 5,758,000 | A | 5/1998 | Zheng | 385/97 |
| 5,815,611 | A | 9/1998 | Dhadwal | 385/12 |
| 6,034,718 | A | 3/2000 | Hattori | 348/61 |
| 6,088,503 | A | 7/2000 | Chandler et al. | 385/135 |
| 6,190,057 | B1 | 2/2001 | Osaka et al. | 385/96 |
| 6,203,214 | B1 | 3/2001 | Wesson | 385/97 |
| 6,206,583 | B1 | 3/2001 | Hishikawa et al. | 385/96 |
| 6,246,819 | B1 | 6/2001 | Windebank | 385/48 |
| 6,287,020 | B1 | 9/2001 | Osaka et al. | 385/96 |
| 6,294,760 | B1 | 9/2001 | Inoue et al. | 219/383 |
| 6,324,319 | B1 | 11/2001 | Tselikov et al. | 385/28 |
| 6,341,242 | B1 | 1/2002 | Mahmood et al. | 700/117 |

OTHER PUBLICATIONS

Ericsson, "Three Splicers—Each With Its Own Unique Features", En/LZT 108 1069, http://www.ericsson.com/networktechnologies/printed/broshyr/1069_fsu995_revb.pdf.

FITEL Technologies, Inc., "Polarization Maintaining Fiber Fusion Splicer", models S182 PM & S182 PM-H, http://www.fitelconn.com/pdf/s182pm.pdf, and http://www.fitelconn.com/pdf/s182pmh.pdf.

Fujikura, "Products FSM-40PM Factory Splicer for Polarization Maintaining Fiber Splicing", http://www.fujikura.co.jp/splicer/fsm-40pm/fsm-40pm.html.

Fujikura, "Products FSM-40PM Factory Splicer for Polarization Maintaining Fiber Splicing", http://www.fujikura.co.jp/splicer/fsm-40f/fiber-holder-system/fiber-holder-system.html.

Fujikura, "Products FSM-40PM Splice Data For PANDA & Tiger™ Fibers", http://www.fujikura.co.jp/splicer/fsm-40pm/splice-data/splice-data.html.

Fujikura, "Products FSM-40PM Typical Tensile Strength Data", http://www.fujikura.co.jp/splicer/fsm-40f/tensile-strength-data/high-tensile-strength.html.

"The Significance of Polarization Cross-Talk vs. Extinction Ratio In The Analysis and Measurement of PM Fiber Splicing Performance", *AFL-Fujikura Proprietary*.

LOW PROFILE LOCAL INJECTION AND DETECTION SYSTEM FOR OPTICAL FIBER WAVEGUIDES

This application claims the benefit of application Ser. No. 60/456875, filed Mar. 24, 2003.

BACKGROUND OF THE INVENTION

1. Field of the Invention

This invention relates to a system for assessing the propagation of light between optical fiber waveguides used for data transmission and communication; and more particularly, to a low profile system for injecting light into a first optical fiber waveguide; transmitting the light to a second optical fiber waveguide associated with the first optical fiber waveguide; extracting a portion of the light from the second optical fiber waveguide; and measuring the intensity of the extracted light.

2. Description of the Prior Art

Transmission of data by optical fiber waveguides, also called fiber optics or optical fibers, has become ubiquitous in the telecommunications and computer industries. Digital information in an electronic system is converted into a series of pulses of light generated by lasers or light emitting diodes (LED's) which are injected into long fibers of glass or polymeric materials. The fibers are capable of propagating the light with extremely low losses and acceptably low dispersion, whereby information embodied in the modulation pattern may be conveyed. The light that emerges from the other end of the fiber can be detected and reconverted into electronic signals that faithfully reproduce the original signal.

Fiber optic communication has a number of advantages over traditional transmission means such as hard-wired coaxial and twisted pair cable and lower frequency electromagnetic broadcasting such as radio and microwave. Foremost is the much larger bandwidth available. In addition, existing infrastructure such as cable ducts, utility poles, and the like presently used by telecommunications companies can be upgraded with relatively little disruption and moderate cost by substituting optical fiber cable for existing copper wire. Thus, dramatic increases in bandwidth needed to accommodate the needs of an information-based, Internet-driven society and commerce can be obtained with comparatively little disruption.

Fiber optic communications have additional advantages for certain specialized requirements. Fiber optic connections are far less vulnerable to electromagnetic disruptions and nuclear radiation, whether of natural origin or the result of the use of certain military weapons. Fiber optics are now widely used in aerospace and shipboard applications for many of these reasons.

Implementation of fiber optic systems requires both the equipment for actual transmission and processing of the data, and the equipment needed to install and maintain the fiber optic system and its infrastructure. The transmission and processing equipment, such as the fiber itself and the corresponding components needed to generate, detect, and process optically-borne information, have been developed to an ever increasing level of sophistication. While certain systems for joining and splicing fiber optic cables have been developed, there remains a need in the art for improved equipment and methods for splicing that are reliable, economical, and which result in minimal loss of signal integrity and strength. Such systems, equipment, and methods are essential if the full inherent advantages of optical transmission are to be more widely implemented.

The need for improved methods is especially acute for field installation and repair, which are frequently carried out under adverse conditions. Among the most significant needs is for effective means of splicing fiber optic cables both during initial installation and when repairs or modifications are needed. In the telecommunications industry, repairs frequently must be made to overhead lines by a technician operating from a ladder, lift bucket, sometimes during darkness and with adverse weather conditions such as precipitation, cold, and wind. Other repairs must be made in cramped conditions in underground vaults and cable lockers.

Fiber optic communication systems are also commonly used for process control, data, and voice communications in industrial and manufacturing facilities. In these venues, the immunity of optical systems to electronic and electromagnetically-induced noise and the elimination of electrical hazards are particularly beneficial. Cables in these locations are often routed through tight quarters, some in hazardous locations, making access for repair difficult. Communication systems on ships and in airplanes and spacecraft likewise advantageously employs fiber optic transmission; cable routing and access are often comparably problematic in these applications. In most of the aforementioned situations repair is further hampered because of the limited length of slack in the fiber that may be accessible for the technician to manipulate into a splicing device. The need for a system usable for making emergency repairs on fiber optic systems aboard military aircraft, ships, and submarines under operational or battle conditions is especially acute.

Together, these considerations call for splicing systems that are compact, portable, and able to be operated rapidly and reliably under adverse working conditions and with minimal slack cable. Moreover, it is desired that such a splicing system be capable of joining two fibers in a way that (i) causes minimal disruption or discontinuity in the optical transmission, (ii) does not adversely increase the diameter and volume of the cable, and (iii) has a durability as close as possible to that of an original fiber. Systems are also desired that are simple and reliable enough to be used by technicians who lack extensive training. There remains an urgent need for optical splicing systems that satisfy these requirements.

Optical fiber waveguides in common use share a number of structural features. The waveguide almost invariably comprises a thin, elongated fiber core responsible for conducting the light and at least one additional layer. Most often the fiber core is highly pure glass surrounded by a first and intimately-bonded layer termed a cladding and an outer layer called a buffer. The cladding, usually also glass, has an index of refraction lower than that of the core to insure that light is constrained for transmission within the core by total internal reflection. Typically the buffer is composed of plastic or polymer and serves to protect the inner layers mechanically and to prevent attack by moisture or other substances present in the fiber's environment. Commonly a plurality of individual fibers (in some cases as many as a thousand) constructed in this fashion are bundled together and enclosed in a protective jacket to form a cable.

Commonly used fibers may further be classified as multimode or single mode. Multimode fibers typically comprise cores having diameters of 50–62.5 $\mu$m but in some cases up to 100 $\mu$m. Single mode fibers generally have a much smaller core that may be 9 $\mu$m or less in diameter. The glass cladding diameter is most commonly 125 $\mu$m but sometimes is 140 $\mu$m (with a 100 $\mu$m core). The exterior diameter is largely a function of the buffer coating, with 250 µm most common, although some fiber coatings may be as much as 900 µm in diameter. Alignment of fibers is a crucial part of the preparation for any splicing operation, but is especially challenging for single mode fibers that have small core diameter. In order to produce a high quality, low-loss splice, the two opposing ends to be joined must be aligned laterally to within a small fraction of the core diameter. Of course, the smaller the fiber diameter, the smaller the allowed deviation from perfect abutting alignment that may be tolerated.

Most fiber optic data transmission systems transmit information using electromagnetic radiation in the infrared band, including wavelengths such as 850 nm for multimode fibers and 1310 and 1550 nm for single mode fibers. The nomenclature "light" is invariably employed for this radiation, even though the cited wavelengths fall outside the range visible to humans.

Two general approaches for splicing optical fibers are in widespread use, viz. mechanical and fusion splicing. Mechanical splicing is accomplished by securing the ends of two fibers in intimate proximity with an aligning and holding structure. Often the fibers are inserted into the opposing ends of a precision ferrule, capillary tube, or comparable alignment structure. The fibers are then secured mechanically by crimping, clamping, or similar fastening. An adhesive is also commonly used. In some cases a transparent material such as a gel having an index of refraction similar to that of the fiber cores is used to bridge the gap between the fibers to minimize reflection losses associated with the splice. Mechanical splicing is conceptually simple, and minimal apparatus is required to effect splicing. However, even in the best case, a mechanical splice has relatively high and undesirable insertion loss, typically 0.20 dB. In addition, mechanical splices are generally weaker than the underlying fiber and are notoriously vulnerable to degradation of the optical quality of the splice over time, especially under adverse environmental conditions such as varying temperatures and high humidity. Mechanical splices are generally regarded as being temporary expedients at best and are not useful for high bandwidth systems or permanent joints.

Fusion splicing entails the welding of the two fiber ends to each other. That is, the ends are softened and brought into intimate contact. The softening is typically induced by heat from a small electric arc struck between miniature pointed electrodes mounted in opposition and substantially perpendicular to the common axis of the fibers. Upon cooling, a strong, low-loss joint is formed. When properly carried out, fusion splices exhibit very low losses along with high stability and durability rivaling those of the uncut fiber. Mechanical protection is often provided by a heat-shrinkable tube applied over the completed joint. The tube replaces the buffer coating that generally must be removed prior to splicing. In many cases the heat-shrinkable tube is reinforced by incorporation therein of a length of metallic wire for stiffness.

One essential requirement for a low insertion loss splice is careful preparation and precise alignment of the ends of the fibers being joined. The axes of the fibers must be collinear within about 0.1 degree and aligned laterally within a small fraction of the core diameter to achieve the desired loss of less than about 0.03 dB. This required precision of alignment presents a substantial technical challenge, especially with single-mode fibers having cores approximately 9 µm diameter. Three general approaches have been proposed in the prior art. The simplest expedient is the use of mechanical fixturing, such as the alignment ferrules described above and other forms of pre-aligned V-grooves and the like. These purely mechanical approaches do not reliably produce splices that maintain less than 0.10 dB loss and so are ill suited for the demands of advanced, high-bandwidth communications systems. More sophisticated approaches employ some form of optically assisted fiber positioning. One such method is termed a profile alignment system (PAS). In this approach, the splicing apparatus incorporates an optical system that acquires images of the two fibers taken in two lateral directions, allowing the fibers to be positioned in two directions orthogonal to the mutual fiber axes. PAS systems may incorporate either manual positioning or may employ computerized image processing to optimize the alignment. However, the diffraction limit restricts the precision achievable with PAS, even in systems based on visible light with wavelengths of about 400–700 nm. This particularly compromises the effectiveness of PAS in aligning small diameter, single mode fibers.

Still more advanced positioning methods have been proposed that employ measurement of actual light transmission between the fibers being joined. The positioning of the fibers is adaptively adjusted to maximize light transmission prior to the fusion operation. It is found that under carefully controlled laboratory conditions this approach may permit alignment better than that achievable with PAS systems.

However, the methods and apparatus for carrying out splicing aided either by the PAS or transmission-based alignment techniques have heretofore not been well suited for use outside the laboratory or other similarly controlled workplace. The required equipment lacks the flexibility, versatility, and ruggedness needed for field use. Moreover, present equipment is cumbersome and not operable in the confined spaces frequently encountered during field service.

Notwithstanding numerous advances in the field of fiber optic joining, there remains a need in the art for an economical, efficient process for forming low-loss, durable, and reliable splices in fiber optic cables. Also needed is portable splicing equipment that can be operated by technicians without extensive training to accurately and efficiently join fiber optic cables in tightly confined spaces and under adverse environmental conditions.

SUMMARY OF THE INVENTION

The present invention provides a system for measuring the attenuation of light propagating between a first and a second optical fiber waveguide associated therewith. Advantageously, the system is employed in an apparatus for fusion splicing of two fibers, as it allows the fibers to be efficiently and precisely aligned prior to fusion. Accurate alignment advantageously results in a joint through which a light signal may propagate with its signal strength and integrity maintained, because the insertion loss and back reflection attributable to the joint are rendered extremely low.

Generally stated, the system comprises a light injector and a light detector and will be referred to hereinbelow as a local injection/detection or "LID" system. More specifically, light emanating from a light source in the injector is coupled into a first optical fiber. The light propagates through the first fiber and a portion of it enters a second fiber associated with the first fiber. Any light lost at the junction is deemed transmission loss. A portion of the light in the second fiber is then extracted and allowed to impinge on the light detector. The extracted light is received and detected by a light responsive element in the detector. The injection and extraction each occur at points at which the respective fibers are bent to a small radius of curvature. The intensity of the light present at the light responsive element is indicative of the attenuation of light in passing from the injection point to the extraction point. The attenuation is normally dominated by loss at the interface or joint between the fibers.

The present LID system may advantageously be incorporated in an optical fiber splicing system, which employs the LID system to effect optimal alignment of the fibers prior to the actual fusion splicing. The fibers are moved relative to one another to effect an alignment which maximizes the transmission of light across the gap between the fibers prior to initiation of the fusion process. Comparison of the measured attenuation before and after the slicing is complete permits an approximate determination of the final insertion loss of the splice.

In one aspect of the invention there is provided a system for assessing the propagation of light between a first and a second optical fiber associated therewith. The system comprises a light injector having an injector base attachable to a substrate and a light detector having a detector base attachable to a substrate. The light injector comprises (i) an injector cover, at least a portion of which is slidably movable in a plane parallel to the injector base, the movable portion having an open position and a closed position, the open position permitting insertion of the first fiber into the injector; (ii) an injector window having a substantially planar entry face and a concave, arcuate exit face; (iii) an injector mandrel having a shape complementary to that of the exit face of the injector window, and being biased to clasp a portion of the first optical fiber in intimate contact between the injector mandrel and the exit face of the injector window, the injector mandrel being reversibly retractable from the exit face in response to motion of the injector cover from the closed position to the open position thereof; (iv) a light source positioned proximate the entry face of the injector window; and (v) optionally, a focusing lens interposed between the light source and the entry face of the injector window. If used, the focusing lens is preferably in the form of a right circular cylinder of glass having a radially graded refractive index and disposed with its cylindrical axis substantially coincident with the optical path. One form of such lenses is sold commercially by Nippon Sheet Glass under the tradename "SELFOC." However, lenses of other known types, including conventional convex lenses composed of conventional optical materials may also be used in constructing the optical system of the present injector.

In this configuration, light emanating from the source is focused, passes through the injector window into the buffer of the first fiber and thereafter into the first fiber core. The first fiber enters the injector in an entry direction and emerges from the injector in an exit direction, the entry and exit directions being substantially parallel. The first fiber traverses a path through the injector substantially in a plane which is substantially parallel to the injector base.

The system further employs a light detector comprising: (i) a detector cover, at least a portion of which is slidably movable in a plane parallel to the detector base, the movable portion having an open position and a closed position, the open position permitting insertion of the second fiber into the detector; (ii) a detector window having a concave, arcuate entry face and a substantially planar exit face; (iii) a detector mandrel having a shape complementary to that of the entry face of the detector window, the detector mandrel being biased to clasp a portion of the second optical fiber in intimate contact between the detector mandrel and the entry face of the detector window, and the detector mandrel being reversibly retractable from the entry face in response to motion of the detector cover from the closed position to the open position thereof; (iv) a light responsive element to detect light emerging from the fiber, the light responsive element being positioned proximate the exit face, whereby light emanating from the buffer passes through the detector window into the light responsive element; and (v) optionally, an optical filter interposed between the detector window and the light responsive element. The second fiber enters the detector in an entry direction and emerges from the detector in an exit direction, the entry and exit directions being substantially parallel. The second fiber traverses a path through the detector in a plane which is substantially parallel to the detector base.

High pass, low pass, and bandpass filter materials suitable for the optical filter used in the present LID detector are known in the optical materials art. Preferably an optical filter is selected that preferentially transmits light of the wavelength emitted by a LID injector associated with the LID detector but which strongly attenuates or blocks both extraneous ambient light and light of other wavelengths carried by the optical fiber. Use of such a filter material beneficially enhances the signal to noise ratio of the LID detection system. It is further preferred that the cover components of both the LID injector and detector be composed of materials that are substantially opaque, at least at the wavelength of the LID light, to limit noise coming from extraneous ambient light.

The light source in the light injector is operably connected to, and energized by, a driver. A receiver determines the intensity of light incident on the light responsive element of the light detector. The LID system, along with the other components of the splicing system, is operable in any spatial orientation, facilitating the splicing system's use in awkward locations.

Preferably, the LID injector and detector are attached to a common substrate and oriented such that the supply ends of the first and second fibers enter the injector and detector, respectively, in directions that are substantially collinear. Likewise, the free ends of the fibers to be joined emerge from the injector and detector, respectively, along a common direction that is generally parallel the aforementioned supply direction and only slightly displaced therefrom. Preferably the portion of the fibers in both injector and detector are substantially within a common horizontal plane parallel to the substrate. This disposition of the LID components allows the fibers to be inserted in the LID system despite the availability of only a minimum amount of free slack. As a result, the system is operable in close proximity to a wall, cable, conduit, or other location where fiber is present. By way of contrast, prior art systems have required much larger fiber loops with correspondingly more slack demanded and so were frequently not operable in tight quarters.

In another aspect, the present invention provides a light injector for use in a modular, low profile, fiber optic fusion splicing system. Such a system is especially useful for field installation and repair even under adverse conditions. The injector has an injector base attachable to a substrate and comprises: (i) an injector window having an entry face and a concave, arcuate exit face; (ii) an injector mandrel having a shape complementary to that of the exit face of the injector window, the injector mandrel being biased to clasp a portion of an optical fiber in intimate contact between the injector mandrel and the exit face of the injector window, and the injector mandrel being reversibly retractable from the exit face; (iii) a light source positioned proximate the entry face of the injector window, whereby light emanating from the source passes into the fiber; and (iv) an optional focusing lens near the exit face of the injector window. Preferably the focusing lens is a right circular cylinder constructed of material having a radially graded refractive index. The fiber enters the injector in an entry direction and emerges from the injector in an exit direction, the entry and exit directions being substantially parallel, and the fiber traversing a path through the injector substantially in a horizontal plane parallel to the injector base. Preferably the injector further comprises an injector cover, at least a portion of which is movable in a plane parallel to the injector base, the movable portion having an open position and a closed position, the open position permitting insertion of an optical fiber into the injector; in response to motion of the injector cover from the closed position to the open position thereof.

In another aspect the present invention provides a light detector for use in a modular, low profile, fiber optic fusion splicing system. The detector has a detector base attachable to a substrate and the detector comprises: (i) a detector window having a concave, arcuate entry face and a substantially planar exit face; (ii) a detector mandrel having a shape complementary to that of the entry face of the detector window, the detector mandrel being biased to clasp a portion of an optical fiber in intimate contact between the detector mandrel and the entry face of the detector window, and the detector mandrel being reversibly retractable from the entry face; (iii) a light responsive element positioned proximate the exit face of the detector window, whereby light emerging from the buffer of the fiber passes through the detector window and thereafter into the light responsive element; and (iv) optionally, an optical filter interposed between the detector window and the light responsive element. The fiber enters the detector in an entry direction and emerges from the detector in an exit direction, the entry and exit directions being substantially parallel, and the fiber traversing a path through the detector substantially in a horizontal plane parallel to the detector base. Preferably the detector further comprises an detector cover, at least a portion of which is movable in a plane parallel to the detector base, the movable portion having an open position and a closed position, the open position permitting insertion of an optical fiber into the detector; in response to motion of the detector cover from the closed position to the open position thereof.

In still another aspect of the invention there is provided a method for assessing the transmission of light between a first optical fiber and a second optical fiber associated therewith using local light injection and detection. The method is particularly adapted for characterizing the optical quality of a fusion splice joining two optical fiber waveguides. The method may be carried out under adverse conditions in which access to the fiber is difficult and only a minimum amount of fiber slack is available for manipulation and insertion into the LID system. Generally stated, the method comprises: (i) providing a low profile local injection and detection system comprising a light injector and a light detector mounted in a housing in a common plane, wherein each of the light injector and the light detector has a slidably movable cover, each of the covers being reversibly movable in a direction parallel to the plane to open and close each of the injector and detector; (ii) placing the first fiber into the light injector and the second fiber into the light detector; (iii) injecting light into the first fiber using the light injector; (iv) detecting using the light detector the intensity of light propagated from the first fiber to the second fiber; and (v) inferring the attenuation of light passing from the first fiber to the second fiber from the intensity of light detected by the light detector.

A number of structural and operational advantages are provided by the present system and method for character-izing the transmission of an optical fiber. The arrangement of the fiber in the system is simple and direct, the path remaining substantially in a single plane parallel to the substrate on which the injector and detector are situated. Moreover, the path deviates from a straight line only insofar as necessary to provide sufficient bending to allow insertion and extraction of light for operation of the LID technique. As a result of this simple configuration and component design, a fusion splicing system incorporating the present LID system can operate in very restricted quarters, such as very close to a wall, ceiling, floor, or cable support structure such as a cable tray, and in circumstances wherein the amount of slack available for insertion of fibers into the system is strictly limited.

The present system is also simple to operate. In an aspect of the invention, the mounting of the fiber in each of the injector and detector devices is accomplished simply, as each device is fully actuated by manipulation of its respective cover. Opening the cover retracts the corresponding mandrel, allowing the fiber to be inserted and properly situated; closure secures the fiber in its operational position. The simplicity of the operation allows it to be accomplished by workers who lack extensive training. Moreover, fiber can be mounted with a minimum of manual dexterity and manipulation, as well as in adverse conditions, such as bad weather or poor lighting, which make it difficult or impossible for the operator to see the equipment and the workpieces.

The utility of the present LID system is further enhanced in some embodiments by use of short wavelength light for the LID source, e.g. light having a wavelength ranging from about 800 to 900 nm, and preferably about 850 nm, instead of the 1310 nm or other wavelengths typically used in previous alignment systems for fusion splicing. The shorter wavelength is advantageous for several reasons. Available light sources operating at 850 nm are brighter and cost less. The 850 nm light is less attenuated by typical buffer coatings. In addition, interference in the LID detector from signals at 1310 or 1550 nm present in actively operating fibers is markedly reduced. In most cases these advantages also allow the LID system to be operated without the need for coupling gels previously required. The use of gels is inconvenient and further complicates the splicing process. Moreover, the mode field diameter of a fiber is slightly smaller at shorter wavelengths, improving the achievable precision of active core-to-core alignment.

When used in conjunction with a fiber optic splicing system, the present LID system also enables a better precision of alignment than attainable with known PAS systems. PAS systems are inherently limited by diffraction and the pixel size and resolution of available electro-optic detectors, and so cannot be made more precise than about the wavelength of the illuminating light, which is normally in the visible range of about 400–700 nm. This limitation poses a substantial problem when attempting to align small diameter, single mode fibers that are quite commonly used in advanced long-distance data transmission systems. By way of contrast, the present LID system is not so limited.

BRIEF DESCRIPTION OF THE DRAWINGS

The invention will be more fully understood and further advantages will become apparent when reference is had to the following detailed description of the various embodiments of the invention and the accompanying drawings, wherein like reference numerals denote similar elements throughout the several views, and in which.

DETAILED DESCRIPTION OF THE PREFERRED EMBODIMENTS

The present invention is directed to a system for assessing the transmission of light through an optical fiber waveguide. Preferably the system is compact and low profile. The system is particularly adapted for use in conjunction with a fusion splicing system for joining two optical fibers. Advantageously the present system provides a signal that may be used in the splicing system to optimize the alignment of the fibers prior to fusion, whereby the insertion loss of the splice is minimized. The signal is indicative of the transmission of light across the interface between the fibers, whether before or after splicing. Optimal alignment is effected by minimizing the attenuation before splicing. The resulting fused joint thereby exhibits an advantageously minimized joint insertion loss. In addition, the LID system may be employed to infer the insertion loss by comparing the strengths of the transmitted signal before and after splicing.

Figure 1:
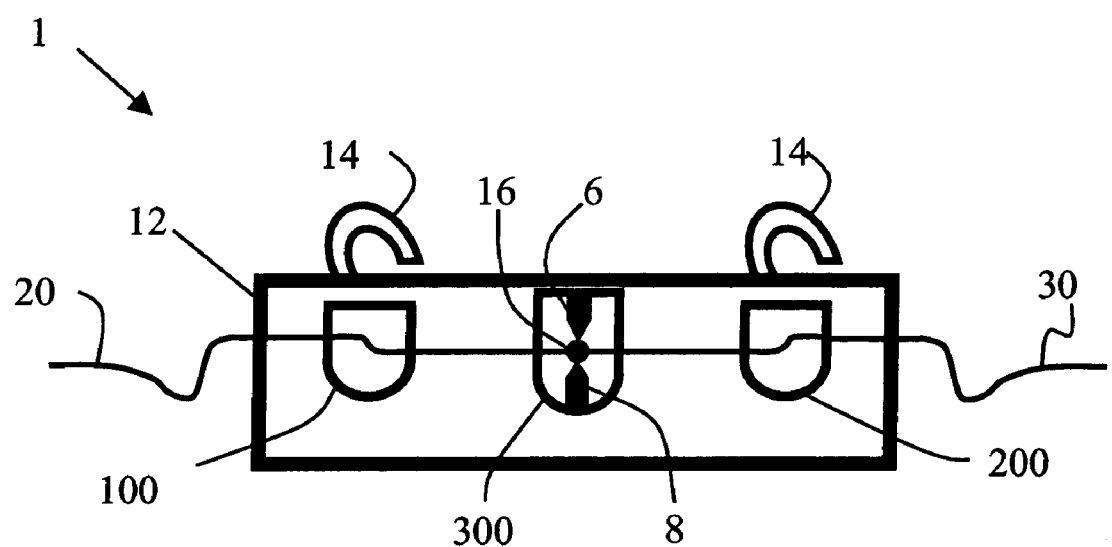
FIG. 1 is a plan view depicting a portion of a fusion splicing system incorporating one embodiment of the local injection and detection system of the invention.

Referring now to FIG. 1 there is depicted generally a fusion splicing head 1 for use in a fusion splicing system. The head incorporates the local injection and detection system of the invention. Optical fibers 20, 30 are positioned in light injector 100 and light detector 200, aspects of which are depicted in greater detail by FIGS. 2–3, respectively. The free ends of the fibers 20, 30 are situated in fusion splicing stage 300. Activation of an electric arc between electrodes 6, 8 causes local softening of the free ends of fibers 20, 30, allowing the ends to be welded, forming joint 16. Elements of the fusion splicing head 1 are mounted in housing 12, which has hooks 14 for hanging head 1 in a convenient location for carrying out field service operations. It will be appreciated that support means other than hooks 14 may also be employed, such as VELCRO™ attachment, brackets, support stands, and the like. The supply ends of the fibers 20, 30 enter injector 100 and emerge from detector 200 in substantially collinear directions. The design of splicing head 1, including both the configuration of injector 100, fusion stage 300, and detector 200, and the path of the fibers 20, 30 through the system, is simple, allowing a splicing system comprising head 1 to be used for joining fibers in close proximity to walls, ceilings, cable support structures, and the like. This functionality is enhanced by a compact and low profile design for splicing head 1, by which is meant a system having a small extent in the vertical direction, i.e. the direction perpendicular to the plane in which the fiber path is located.

In one aspect of the invention, the present system incorporates means for injecting light into a first fiber through its buffer layer and corresponding means for detecting the intensity of light emerging through the buffer layer of a second fiber. Light incident on the buffer jacket of the first fiber at an injection position penetrates the buffer and cladding, enters the core, and propagates through the first fiber, gap, and second fiber, emerging from the core of the second fiber through its cladding and buffer at a detection position. These processes require that the fibers be bent at the injection and detection positions. Otherwise, light is constrained by total internal reflection to remain in the fiber core and solely to propagate therethrough.

Figure 2A:
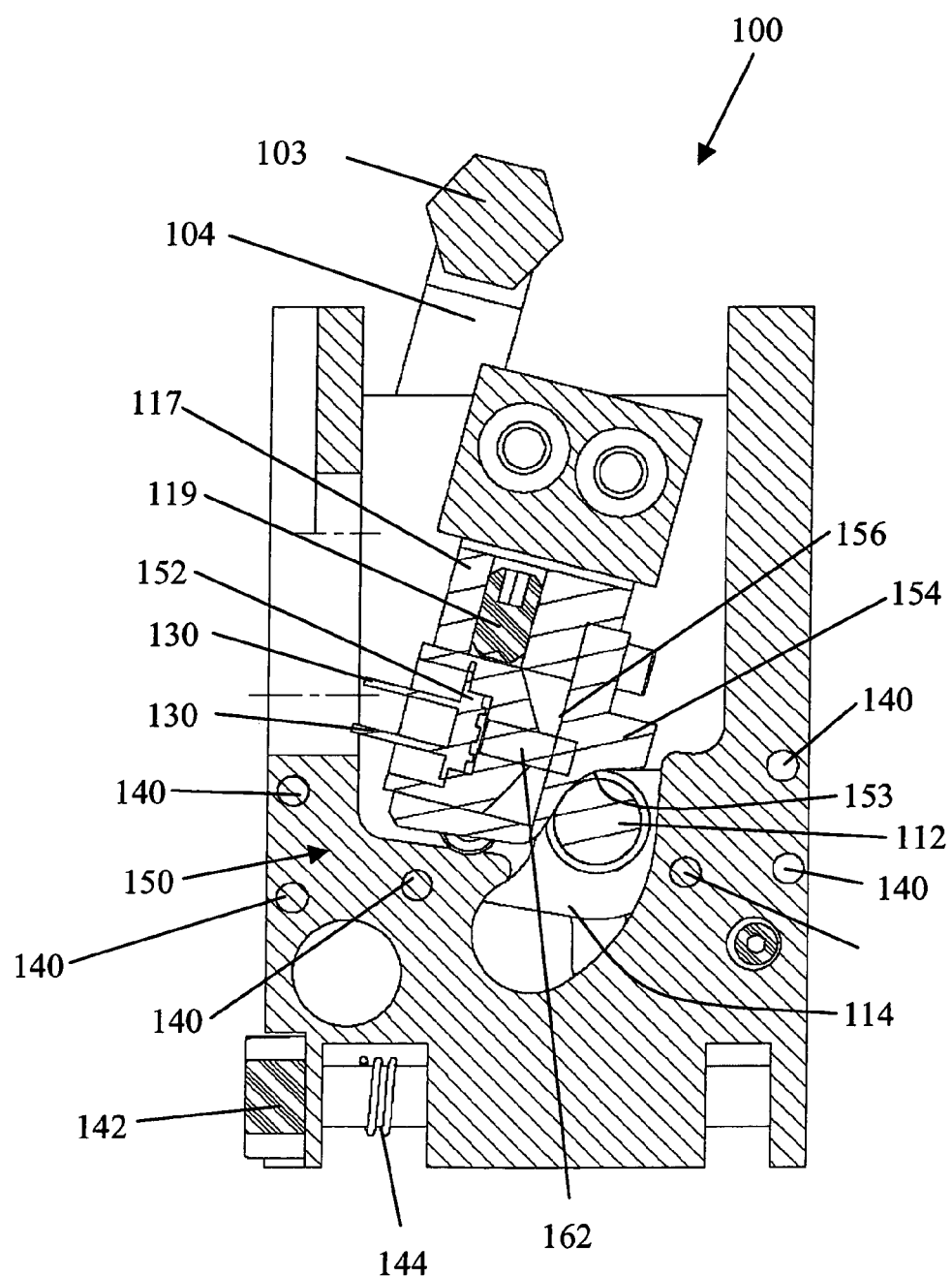
FIG. 2a is a partially cutaway, plan view depicting the top side of the light injector also shown in FIG. 1.
Figure 2B:
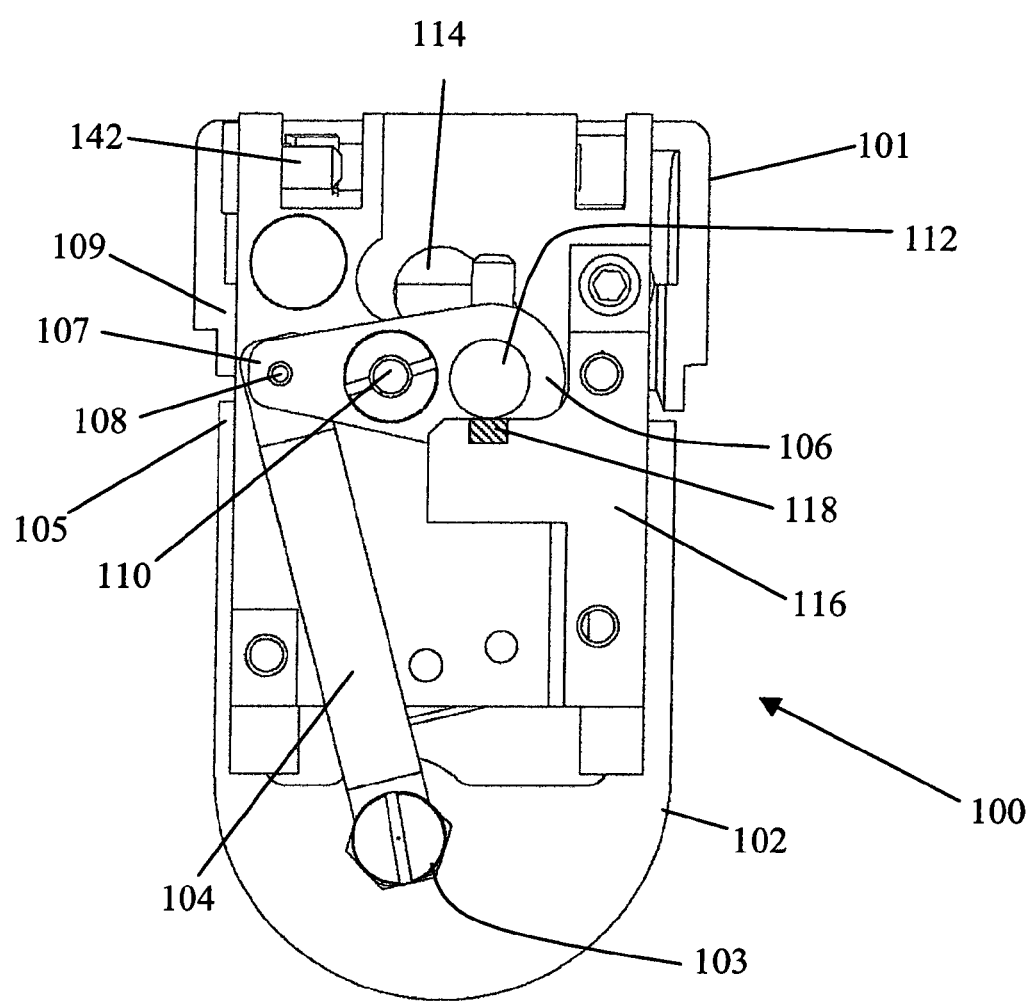
FIG. 2b is a partially cutaway, plan view depicting the underside of the light injector also shown in FIG. 1.

Referring now to FIGS. 2a–2b there is depicted one form of a low profile LID injector 100 for injecting light into an optical fiber waveguide 20. Injector 100 is mountable on a substrate and preferably is covered by a cover, at least a portion of which is movable to provide access for inserting fiber 20. In the embodiment shown the cover comprises slidably movable rear portion 102 and front portion 101, which is upwardly rotatable about pivot 142. Spring 144 or other similar closure means biases portion 101 into the closed position. In other embodiments portion 101, if present, is fixed. For clarity portions 101 and 102 are not shown in FIG. 2a. As best visualized by reference to FIG. 2b, opening movable cover 102 of injector 100 retracts injector mandrel 112, allowing access to fiber path 150. As depicted by FIG. 2a, path 150 is delimited by fiber alignment guide pins 140. Rotatable portion 101 preferably includes elastic prongs on its underside, so that in its closed position it locates and holds fiber 20 flat on path 150 before being finally secured by mandrel 112. Closing cover 102 returns mandrel 112 to bear on fiber 20, which is thereby grasped between arcuate, concave surface 153 of injector window 154 and the upper portion of mandrel 112. Cover 102 actuates mandrel 112 through the action of a mechanical linkage comprising crank actuator 104 and crank 106. One end of crank actuator 104 is attached by a screw 103 to a threaded boss on the underside of cover 102. The other end of crank actuator 104 is rotatably attached by pin 108 to clevis 107 at one end of crank 106. Crank 106 is pivotally attached at a point intermediate mandrel 112 and pin 108 by a screw 110 to a boss on the underside of optics mount 117. Mandrel 112 is disposed in a hole at the end of crank 106 opposite clevis 107. The opening and closing of cover 102 thereby moves mandrel 112 through mandrel guide slot 114 in mount 117. Mandrel 112 is preferably composed of a ferromagnetic material, such as a magnetic stainless steel. When cover 102 is in the closed position, the lower portion of mandrel 112 is proximate at least one permanent magnet 118 which is disposed in a blind hole in magnet mount 116. Mandrel 112 acts to close the magnetic circuit formed in cooperation with magnet 118. The resulting attractive force acting on mandrel 112 is communicated through crank actuator 104 and crank 106 to urge cover 102 into closed position. Magnet 118 is preferably a high energy product magnet such as an FeNdB, SmCo, or other rare earth-base magnet to provide high holding power with minimum volume. In other embodiments of the invention the biasing of mandrel 112 to its closed position is accomplished by magnetic attraction of another ferrous structure connected to mandrel 112. Alternatively mandrel 112 may be biased by an elastically deformable member such as a coil or leaf spring connected thereto in a manner obvious to one skilled in the art.

Preferably, the injector cover portions are made of an opaque material and thereby cooperate to shield the components of LID injector 100 from externally incident light. However, light generated by injector light source 152, which is electrically energized through leads 130, enters and passes through entry surface 156 of injector window 154, emerges through concave surface 153 of window 154, and enters fiber 20 through the buffer coating thereof in the portion of the fiber bent and held in conformity to surface 153 by mandrel 112. Preferably concave surface 153 and mandrel 112 have complementary shapes. Disposition of fiber 20 in clasping contact between arcuate surface 153 and mandrel 112 deflects fiber 20 sufficiently for light from source 152 incident on the buffer jacket of fiber 20 to be injected into the fiber core for propagation therethrough. Light source 152 is secured in optics mount 117 by setscrew 119. Optionally, a focusing lens is interposed between light source 152 and entry surface 156, e.g. in a counterbore in window 154.

Injector window 154 is preferably made of a material having an index of refraction ranging from about 1.45 to 1.6 to approximately match that of typical buffer coating materials and thereby optimize light coupling between them. Arcuate, concave surface 153 preferably has a shape approximating a section of a right circular cylinder whose radius of curvature is at least about 3 mm. Preferably the radius of curvature ranges from about 3 to 4 mm. The use of a small curvature allows the LID injector and LID detector presented herein to be made compact and to efficiently inject and extract light. However bending a fiber to radius of curvature less than about 3 mm subjects the fiber to a surface strain that may deleteriously exceed its rated limit.

Light source 152 may comprise any means of illumination but preferably comprises a light emitting diode (LED). A semiconductor laser or other suitable light source may also be used. The use of a source that emits at a short wavelength (e.g. a wavelength ranging from about 800 to 900 nm, and preferably about 850 nm) is preferred, as discussed in greater detail hereinabove.

Figure 3A:
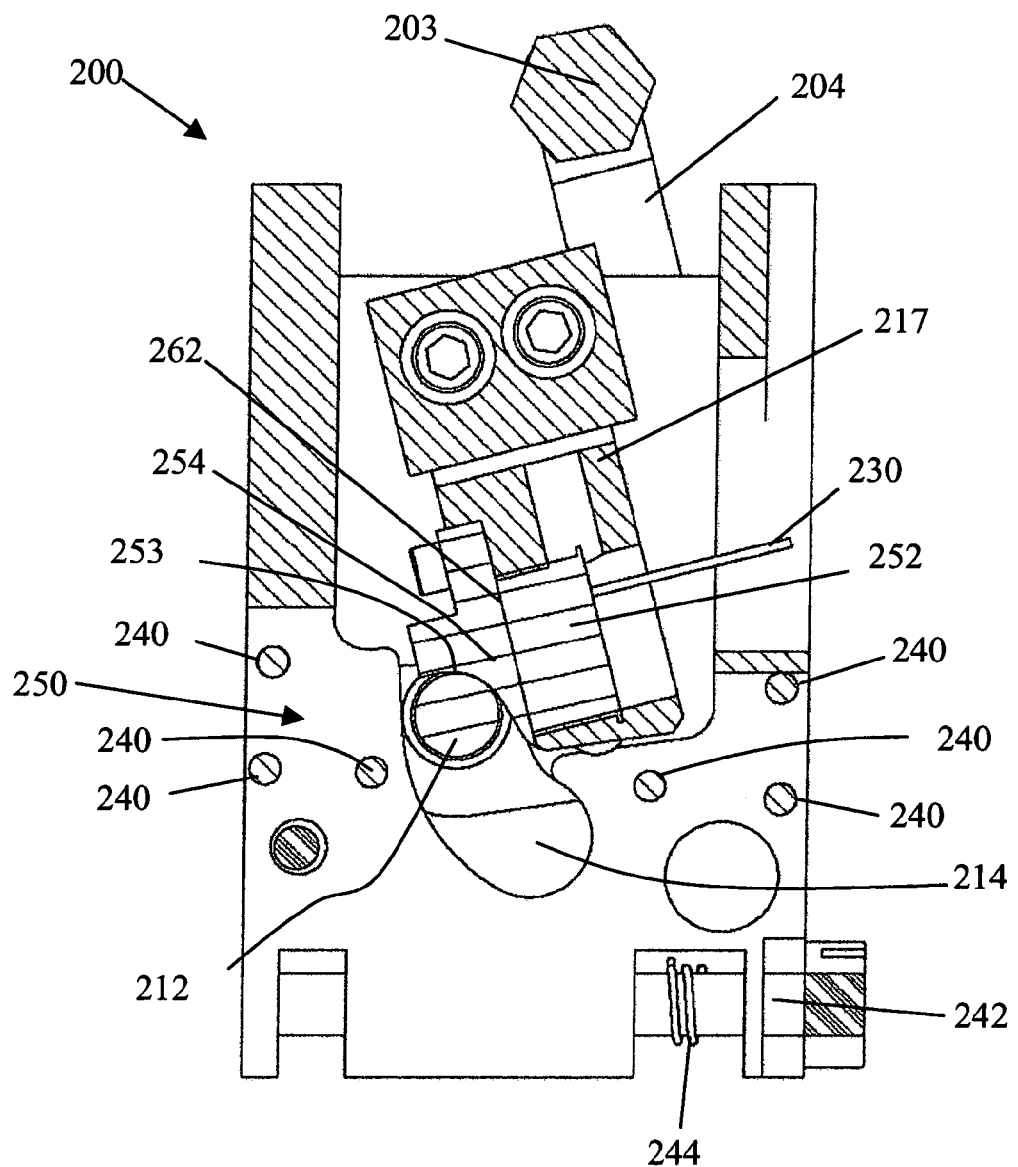
FIG. 3a is a partially cutaway, plan view depicting the top side of the light detector also shown in FIG. 1.
Figure 3B:
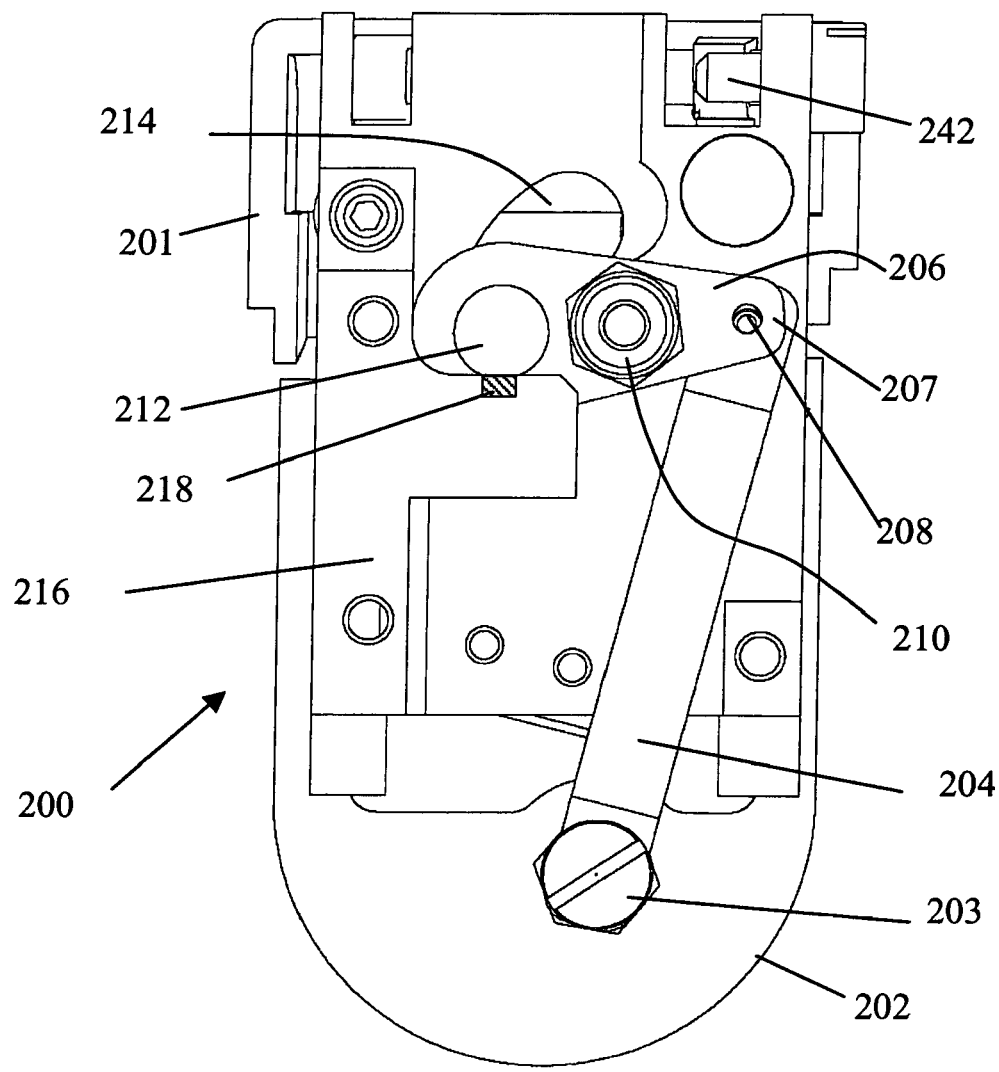
FIG. 3b is a partially cutaway, plan view depicting the underside of the light detector also shown in FIG. 1.

FIGS. 3a–3b depict a LID detector 200 of the invention. LID detector 200 corresponds to LID injector 100 depicted by FIGS. 2a–2b and is similar in structure, mechanical operation, and engagement of an optical fiber passing through it. A light responsive detection element 252 replaces light source 152 of injector 100. Preferably detector 200 has a structure which is generally a complementary, mirror image of injector 100 so that a LID system comprising both has improved compactness.

More specifically, in FIGS. 3a–3b there is depicted one form of a low profile LID detector 200 for injecting light into an optical fiber waveguide 30. Detector 200 is mountable on a substrate and preferably is covered by a cover, at least a portion of which is movable to provide access for inserting fiber 30. In the embodiment shown the cover comprises slidably movable rear portion 202 and front portion 201, which is upwardly rotatable about pivot 242. Spring 244 or other similar closure means biases portion 201 into the closed position. In other embodiments portion 201, if present, is fixed. For clarity portions 201 and 202 are not shown in FIG. 3a. As best visualized by reference to FIG. 3b, opening the movable cover of detector 200 retracts detector mandrel 212, allowing access for placing fiber 30 into fiber path 250. As depicted by FIG. 3a, path 250 is delimited by fiber alignment guide pins 240. Rotatable portion 201 preferably includes elastic prongs on its underside, so that in its closed position it locates and holds fiber 30 flat on path 250 before being finally secured by mandrel 212. Closing the movable cover returns mandrel 212 to bear on fiber 30, which is thereby grasped between arcuate, concave surface 253 of detector window 254 and the upper portion of mandrel 212. The movable cover actuates mandrel 212 through the action of a mechanical linkage comprising crank actuator 204 and crank 206. One end of crank actuator 204 is attached by a screw 203 to a threaded boss on the underside of the movable cover. The other end of crank actuator 204 is rotatably attached by pin 208 to clevis 207 at one end of crank 206. Crank 206 is pivotally attached at a point intermediate mandrel 212 and pin 208 by a screw 210 to a boss on the underside of detector optics mount 216. Mandrel 212 is disposed in a hole at the end of crank 206 opposite clevis 207. The opening and closing of the movable cover thereby moves mandrel 212 through detector mandrel guide slot 214 in mount 216. Mandrel 212 is preferably composed of a ferromagnetic material such as a magnetic stainless steel. When the cover is in the closed position, the lower portion of mandrel 212 is proximate at least one permanent magnet which is disposed in a blind hole in detector magnet mount 216. Mandrel 212 acts to close the magnetic circuit formed in cooperation with the magnet. The resulting attractive force acting on mandrel 212 is communicated through crank actuator 204 and crank 206 to urge the movable cover into closed position. Magnet 218 is preferably a high energy product magnet such as an FeNdB, SmCo, or rare earth-base magnet for high holding power with minimum volume. In other embodiments of the invention the biasing of mandrel 212 to its closed position is accomplished by magnetic attraction of another ferrous structure connected to mandrel 212. Alternatively mandrel 212 may be biased by an elastically deformable member such as a spring connected thereto in a manner obvious to one skilled in the art.

Preferably, the detector cover portions are made of an opaque material and thereby cooperate to shield the components of LID detector 200 from externally incident light. However, a portion of this light propagating through fiber 30 is extracted therefrom at a bend in fiber 30 at the location where fiber 30 is clasped between mandrel 212 and concave surface 253. The extracted light passes through the buffer of fiber 30 and enters window 254 through entry surface 253. Light emerges from window 254 through exit surface 256. A filter 262, preferably in the form of a sheet, is optionally interposed between surface 256 and light responsive element 252. Preferably, the filter selectively transmits light of the wavelength emitted by the light injector. Implementations using 850 nm light for the LID system and a corresponding filter are especially advantageous, as a result of their insensitivity to light of other wavelengths such as the 1310 and 1550 nm that may be present in fibers of an operating communications system.

Detector window 254 is preferably made of a material having an index of refraction ranging from about 1.45 to 1.6 to approximate the index of refraction of the buffer coating material and thereby optimize light coupling between the fiber and window. Arcuate, concave surface 253 preferably has a shape approximating a section of a right circular cylinder whose radius of curvature is at least about 3 mm. Preferably the radius of curvature ranges from about 3 to 4 mm.

Light responsive element 252 abutting exit surface 256 of window 254 may comprise any electronic element whose electrical characteristics change in response to the incidence of light thereon. Preferably the light responsive element comprises a phototransistor, Si or InGaAs PIN diode, avalanche photodiode (APD), or other element electrically responsive to light of the wavelength emitted by light source 152. A Si PIN diode is preferred for its availability, low cost, low noise, and immunity to radiation of wavelength longer than about 1050 nm.

In an aspect of the invention, each of the LID injector 100 depicted by FIGS. 2a–2b and the LID detector 200 depicted by FIGS. 3a–3b is advantageously used in a low profile, modular fiber optic splicing system. Each of injector 100 and detector 200 is operated by sliding its respective cover to the open and closed positions. The simplicity of these operations allows optical fiber to be easily placed within the unit and subsequently removed after the splicing operation is completed. The operation of the LID system may be employed by the splicing system to achieve proper of the alignment of the fibers so they may be joined in a joint that causes minimal insertion loss. Moreover, the fiber splicing system may be made compact, portable, and easily operated under adverse circumstances as a result of the advantageous design of the LID injector and LID detector.

In other implementations of the invention the injector and detector are actuated by covers operable with other forms of in-plane motion. For example, in some embodiments the covers rotate to provide access for mounting fibers and reversibly retracting the respective mandrels from the arcuate faces to which they mate. Other configurations will be obvious to those skilled in the art and are within the scope of the present invention. The optical systems of such injectors and detectors are generally similar in construction and operation to those in the corresponding embodiments depicted by FIGS. 2–3, respectively.

The LID system of the present invention is advantageously employed in the construction of a modular, low profile system for fusion splicing of optical fibers. The LID injector and detector are conveniently mountable on the opposite sides of a fusion splicing stage. The LID injector and detector both have a low profile, having no need for clearance above the devices to accommodate the open position of the upwardly rotatable closures normally used in conventional systems for mounting, securing, and deflecting fibers. As depicted by FIG. 1, LID devices may be aligned and disposed in close proximity to the opposite sides of a compact fusion splicing stage. This configuration conveniently affords a path through the head of the splicer system for the two optical fibers being joined that is simple and direct. The fibers remain substantially in a single plane parallel to the surface of the splicer head, traversing a path that deviates from a straight line only insofar as necessary to provide sufficient bending to allow injection and extraction of light for operation of the LID technique. Preferably the LID components and the fusion splicing stage are configured as depicted in FIG. 1. The supply ends of first fiber 20 and second fiber 30 enter injector 100 and detector 200, respectively, in directions that are substantially collinear. Likewise, the free ends of the fibers 20, 30 to be joined in joint 16 emerge from injector 100 and detector 200, respectively, along a common direction that is generally parallel the aforementioned supply direction and only slightly displaced therefrom. Furthermore, the LID injector 100 and detector 200 and the fusion splicing stage 300 are preferably situated close to an edge of the splicing head housing.

As a result of this configuration and component design, a fusion splicing system is provided that is compact and low profile, rendering it operable in very restricted quarters, such as very close to a wall, ceiling, floor, or cable support structure such as a cable tray. Moreover, only a minimal amount of free slack is required to situate the fibers in the splicer. These singular and advantageous features are a consequence of factors including the minimal clearance needed on the sides, top, and bottom of a housing for a splicing head that incorporates low profile, compact components, including the components of the LID system provided by the present invention. Other components of the splicing system, including power sources, electronics, and user interface, may be connected to the splicing head but housed separately. The head itself may thus be made quite compact for operation in confined spaces.

The system provides means for effecting high quality, low insertion loss fiber optic splices, for which LID alignment is essential for attaining sufficiently precise alignment of the fibers in preparation for fusion splicing. The markedly improved functionality and portability afforded by a splicer that employs the present LID system is absent from existing systems which cannot perform high quality, low loss splices in the tight confines for which the present system is especially adapted.

In still another aspect of the invention there is provided a method of measuring the attenuation of light transmitted between a first optical fiber and a second optical fiber associated therewith using local light injection and detection. The association may take a number of forms, including, but not limited to, fibers in close or intimate proximity, fibers mechanically spliced, and a fiber splitter. The present method is particularly adapted for characterizing the optical quality of a fusion splice joining two optical fiber waveguides. The method may be carried out under adverse conditions in which access to the fiber is difficult and only a minimum amount of fiber slack is available for manipulation and insertion into the LID system. Generally stated, the method comprises: (i) providing a low profile local injection and detection system comprising a light injector and a light detector mounted in a housing in a common plane, wherein each of the light injector and the light detector has a slidably movable cover, each of the covers being reversibly movable in a direction parallel to the plane to open and close each of the injector and detector; (ii) placing the first fiber into the light injector and the second fiber into the light detector; (iii) injecting light into the first fiber using the light injector; (iv) detecting using the light detector the intensity of light propagated from the first fiber to the second fiber ; and (v) inferring the attenuation of light passing from the first fiber to the second fiber from the intensity of light detected by the light detector. Preferably the LID system employed in the method provides for collinear alignment between the direction of entry and exit of the fiber being characterized. The method is particularly adapted to be used in connection with a system for splicing optical fiber waveguides. Exercise of the LID method provides a signal indicative of the relative alignment of fibers being positioned to be spliced. Advantageously, the splicing system uses adaptive optimization of the strength of the transmitted light to effect optimal alignment of the fibers before splicing and characterization of the optical quality of the joint after completion of the splicing operation.

Having thus described the invention in rather full detail, it will be understood that such detail need not be strictly adhered to but that various changes and modifications may suggest themselves to one skilled in the art, all falling within the scope of the present invention as defined by the subjoined claims.

What is claimed is:

1. A system for assessing the transmission of light between a first optical fiber and a second optical fiber associated therewith, said system comprising:
   a) a light injector having an injector base attachable to a substrate, and comprising:
   (i) an injector cover, at least a portion of which is slidably movable in a plane parallel to said injector base, said movable portion having an open position and a closed position, the open position permitting insertion of said first fiber into said injector;
   (ii) an injector window having an entry face and a concave, arcuate exit face;

(iii) an injector mandrel having a shape complementary to that of said exit face of said injector window, and being biased to clasp a portion of said first optical fiber in intimate contact between said injector mandrel and said exit face of said injector window, said injector mandrel being reversibly retractable from said exit face in response to motion of said injector cover from the closed position to the open position thereof;

(iv) a light source positioned proximate said entry face of said injector window, whereby light emanating from said source passes through said injector window into said first fiber at said exit face; and (v) said first fiber entering said injector in an entry direction and emerging from said injector in an exit direction, said entry and exit directions being substantially parallel, and said first fiber traversing a path through said injector substantially in a plane parallel to said injector base;

b) A light detector having a detector base attachable to said substrate and comprising:

(i) an detector cover, at least a portion of which is slidably movable in a plane parallel to said detector base, said movable portion having an open position and a closed position, the open position permitting insertion of said second fiber into said detector;

(ii) a detector window having a concave, arcuate entry face and an exit face;

(iii) a detector mandrel having a shape complementary to that of said entry face of said detector window, said detector mandrel being biased to clasp a portion of said second optical fiber in intimate contact between said detector mandrel and said entry face of said detector window, and said detector mandrel being reversibly retractable from said entry face in response to motion of said detector cover from the closed position to the open position thereof;

(iv) a light responsive element to detect light emerging from said fiber, said light responsive element being positioned proximate said exit face, whereby light emanating from said fiber at said entry face passes through said detector window into said light responsive element; and (v) said second fiber entering said detector in an entry direction and emerging from said detector in an exit direction, said entry and exit directions being substantially parallel, and said second fiber traversing a path through said detector substantially in a plane parallel to said detector base;

c) a driver operably connected to energize said light source; and d) a receiver for determining the intensity of light incident on said light responsive element.

2. A system as recited by claim 1, wherein each of said first and second optical fibers comprises a core, a cladding, and a buffer.

3. A system as recited by claim 1, wherein said injector further comprises a lens interposed between said light source and said injector window.

4. A system as recited by claim 3, wherein said lens has a graded refractive index.

5. A system as recited by claim 1, wherein said detector further comprises an optical filter interposed between said detector window and said light responsive element, said filter preferentially transmitting light of the wavelength emitted by said light source.

6. A system as recited by claim 1, wherein said injector cover and said detector cover are opaque to light of the wavelength emitted by said injector light source.

7. A system as recited by claim 1, said system being a compact, low profile system.

8. A compact, low profile system for measuring the transmission of light between a first optical fiber and a second optical fiber associated therewith, said system comprising:

a) a low profile light injector having an injector base attachable to a substrate, and comprising:

(i) an injector cover, at least a portion of which is movable in a plane parallel to said injector base, said movable portion having an open position and a closed position, the open position permitting insertion of said first fiber into said injector;

(ii) an injector window having an entry face and a concave, arcuate exit face;

(iii) an injector mandrel having a shape complementary to that of said exit face of said injector window, and being biased to clasp a portion of said first optical fiber in intimate contact between said injector mandrel and said exit face of said injector window, said injector mandrel being reversibly retractable from said exit face in response to motion of said injector cover from the closed position to the open position thereof; and (iv) a light source positioned proximate said entry face of said injector window, whereby light emanating from said source passes through said injector window into said first fiber at said exit face;

b) a low profile light detector having a detector base attachable to said substrate and comprising:

(i) a detector cover, at least a portion of which is movable in a plane parallel to said detector base, said movable portion having an open position and a closed position, the open position permitting insertion of said second fiber into said detector;

(ii) a detector window having a concave, arcuate entry face and an exit face;

(iii) a detector mandrel having a shape complementary to that of said entry face of said detector window, said detector mandrel being biased to clasp a portion of said second optical fiber in intimate contact between said detector mandrel and said entry face of said detector window, and said detector mandrel being reversibly retractable from said entry face in response to motion of said detector cover from the closed position to the open position thereof; and (iv) a light responsive element to detect light emerging from said fiber, said light responsive element being positioned proximate said exit face, whereby light emanating from said fiber at said entry face passes through said detector window into said light responsive element; and c) a driver operably connected to energize said light source; and d) a receiver for determining the intensity of light incident on said light responsive element.

* * * * *